(12) United States Patent
Ha et al.

(10) Patent No.: US 11,658,287 B2
(45) Date of Patent: May 23, 2023

(54) RECHARGEABLE LITHIUM BATTERY

(71) Applicant: Samsung SDI Co., Ltd., Yongin-si (KR)

(72) Inventors: Jaehwan Ha, Yongin-si (KR); Kijun Kim, Yongin-si (KR); Junghyun Nam, Yongin-si (KR); Hoyong An, Yongin-si (KR); Heeeun Yoo, Yongin-si (KR); Yeonhee Yoon, Yongin-si (KR); Kyuseo Lee, Yongin-si (KR); Dongmyung Lee, Yongin-si (KR); Seung-Hun Han, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 106 days.

(21) Appl. No.: 16/862,866

(22) Filed: Apr. 30, 2020

(65) Prior Publication Data

US 2020/0350566 A1 Nov. 5, 2020

(30) Foreign Application Priority Data

May 3, 2019 (KR) .................. 10-2019-0052571

(51) Int. Cl.
| | | |
|---|---|---|
| *H01M 4/36* | (2006.01) | |
| *H01M 4/505* | (2010.01) | |
| *H01M 4/525* | (2010.01) | |
| *H01M 4/58* | (2010.01) | |
| *H01M 4/62* | (2006.01) | |
| *H01M 10/0525* | (2010.01) | |
| *H01M 4/02* | (2006.01) | |
| *H01M 50/417* | (2021.01) | |

(52) U.S. Cl.
CPC .......... *H01M 4/364* (2013.01); *H01M 4/505* (2013.01); *H01M 4/525* (2013.01); *H01M 4/5825* (2013.01); *H01M 4/625* (2013.01); *H01M 10/0525* (2013.01); *H01M 50/417* (2021.01); *H01M 2004/021* (2013.01)

(58) Field of Classification Search
CPC ........ H01M 4/13; H01M 4/131; H01M 4/133; H01M 4/136; H01M 4/366; H01M 4/505; H01M 4/525; H01M 4/2825; H01M 4/62; H01M 4/622; H01M 4/625; H01M 10/052; H01M 10/0525; H01M 10/4235; H01M 2004/021; H01M 2004/027; H01M 50/417; H01M 50/46

See application file for complete search history.

(56) References Cited

U.S. PATENT DOCUMENTS

| | | | |
|---|---|---|---|
| 5,582,931 A | 12/1996 | Kawakami | |
| 6,391,495 B1 | 5/2002 | Choi et al. | |
| 6,465,125 B1 | 10/2002 | Takami et al. | |
| 6,475,678 B1 | 11/2002 | Isao | |
| 6,511,517 B1 | 1/2003 | Ullrich et al. | |
| 6,511,776 B1 | 1/2003 | Ryuji et al. | |
| 10,446,824 B2 | 10/2019 | Morita et al. | |
| 10,476,082 B2 | 11/2019 | Jang et al. | |
| 10,756,352 B2 | 8/2020 | Yoon et al. | |
| 2001/0041289 A1 | 11/2001 | Hikmet et al. | |
| 2002/0004169 A1* | 1/2002 | Yamada .............. | H01M 4/525 429/231.1 |
| 2005/0079422 A1 | 4/2005 | Ko et al. | |
| 2005/0221165 A1 | 10/2005 | Hennige et al. | |
| 2005/0287442 A1 | 12/2005 | Kim et al. | |
| 2006/0099495 A1 | 5/2006 | Suzuki et al. | |
| 2006/0257745 A1 | 11/2006 | Choi et al. | |
| 2007/0057228 A1 | 3/2007 | Huang et al. | |
| 2007/0264577 A1 | 11/2007 | Katayama et al. | |
| 2008/0241864 A1 | 10/2008 | Muraoka et al. | |

(Continued)

FOREIGN PATENT DOCUMENTS

| | | |
|---|---|---|
| CN | 1246736 | 3/2000 |
| CN | 1286507 | 3/2001 |

(Continued)

OTHER PUBLICATIONS

Machine translation of JP 2018-106879, published on Jul. 5, 2018 (Year: 2018).*

(Continued)

*Primary Examiner* — Anca Eoff

(74) *Attorney, Agent, or Firm* — H.C. Park & Associates, PLC

(57) ABSTRACT

A rechargeable lithium battery includes a negative electrode including a negative current collector, a negative active material layer disposed on the negative current collector, and a negative electrode functional layer disposed on the negative active material layer; and positive electrode including a positive current collector and a positive active material layer disposed on the positive current collector, wherein the negative electrode functional layer includes flake-shaped polyethylene particles, the positive active material layer includes a first positive active material including at least one of a composite oxide of a metal selected from cobalt, manganese, nickel, and a combination thereof and lithium, a second positive active material including a compound represented by Chemical Formula 1, and carbon nanotubes, and the carbon nanotubes have an average length of 30 μm to about 100 μm.

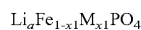

Chemical Formula 1

In Chemical Formula 1, $0.90 \leq a \leq 1.8$, $0 \leq x1 \leq 0.7$, and M is Mn, Co, Ni, or a combination thereof.

20 Claims, 3 Drawing Sheets

(56) References Cited

U.S. PATENT DOCUMENTS

| | | | |
|---|---|---|---|
| 2008/0292965 A1 | 11/2008 | Kubota et al. | |
| 2009/0067119 A1 | 3/2009 | Katayama et al. | |
| 2009/0253043 A1 | 10/2009 | Bak | |
| 2010/0248026 A1* | 9/2010 | Hinoki | H01M 50/46 429/209 |
| 2010/0266905 A1 | 10/2010 | Jeon et al. | |
| 2011/0003209 A1 | 1/2011 | Katayama et al. | |
| 2011/0062378 A1 | 3/2011 | Chang et al. | |
| 2012/0321948 A1 | 12/2012 | Oya et al. | |
| 2013/0011747 A1 | 1/2013 | Sasaki et al. | |
| 2013/0089794 A1 | 4/2013 | Kim | |
| 2013/0236790 A1 | 9/2013 | Byun | |
| 2013/0288093 A1 | 10/2013 | Nakagiri et al. | |
| 2013/0335030 A1 | 12/2013 | Joe et al. | |
| 2013/0337301 A1 | 12/2013 | Joe et al. | |
| 2013/0346000 A1 | 12/2013 | Joe et al. | |
| 2014/0014027 A1 | 1/2014 | Bischoff et al. | |
| 2014/0138591 A1 | 5/2014 | Yoon et al. | |
| 2014/0272489 A1 | 9/2014 | Anandan et al. | |
| 2014/0322600 A1 | 10/2014 | Morita et al. | |
| 2015/0050533 A1 | 2/2015 | Nam et al. | |
| 2015/0221452 A1 | 8/2015 | Iida et al. | |
| 2016/0104880 A1 | 4/2016 | Gao et al. | |
| 2016/0141579 A1 | 5/2016 | Seok et al. | |
| 2016/0268558 A1 | 9/2016 | Sawayama et al. | |
| 2016/0285101 A1 | 9/2016 | Yoshio et al. | |
| 2016/0322636 A1 | 11/2016 | Lee et al. | |
| 2016/0351885 A1 | 12/2016 | Umehara | |
| 2017/0170481 A1 | 6/2017 | Jang et al. | |
| 2017/0187022 A1 | 6/2017 | Isozaki et al. | |
| 2017/0229731 A1 | 8/2017 | Visco et al. | |
| 2017/0288257 A1 | 10/2017 | Kil et al. | |
| 2018/0040899 A1 | 2/2018 | Kuzuoka et al. | |
| 2018/0083312 A1 | 3/2018 | Shiu et al. | |
| 2018/0097218 A1 | 4/2018 | Komura | |
| 2018/0145333 A1* | 5/2018 | Tokune | C01B 32/16 |
| 2018/0191027 A1 | 7/2018 | Ohara et al. | |
| 2018/0205115 A1 | 7/2018 | Haba et al. | |
| 2018/0294516 A1 | 10/2018 | Huang et al. | |
| 2018/0331342 A1 | 11/2018 | Honda et al. | |
| 2018/0375158 A1 | 12/2018 | Morinaka et al. | |
| 2019/0123352 A1 | 4/2019 | Ko et al. | |
| 2019/0123356 A1 | 4/2019 | Ko et al. | |
| 2019/0140283 A1 | 5/2019 | Fukatani et al. | |
| 2019/0229325 A1 | 7/2019 | Ahn et al. | |
| 2019/0334157 A1 | 10/2019 | Seok et al. | |
| 2019/0355952 A1 | 11/2019 | Yoon et al. | |
| 2019/0383465 A1 | 12/2019 | Van Der et al. | |
| 2020/0014027 A1* | 1/2020 | Ha | H01M 50/46 |
| 2020/0014078 A1 | 1/2020 | Ha et al. | |
| 2020/0075955 A1 | 3/2020 | Jeon et al. | |
| 2020/0127257 A1 | 4/2020 | Lee et al. | |
| 2020/0194784 A1 | 6/2020 | Lee et al. | |
| 2020/0350557 A1* | 11/2020 | Ha | H01M 4/622 |
| 2020/0350566 A1 | 11/2020 | Ha et al. | |
| 2020/0350567 A1 | 11/2020 | Ha et al. | |
| 2020/0350568 A1 | 11/2020 | Lee et al. | |
| 2020/0350574 A1* | 11/2020 | Ha | H01M 4/621 |
| 2020/0350580 A1 | 11/2020 | Ha et al. | |
| 2020/0350632 A1* | 11/2020 | Ha | H01M 4/1315 |
| 2021/0074967 A1* | 3/2021 | Kim | H01M 4/622 |
| 2021/0074971 A1* | 3/2021 | Kim | H01M 50/367 |
| 2021/0074972 A1* | 3/2021 | Kim | H01M 4/62 |
| 2021/0074975 A1* | 3/2021 | Kwak | H01M 10/613 |
| 2021/0074979 A1* | 3/2021 | Kwak | H01M 50/3425 |
| 2021/0074980 A1* | 3/2021 | Kim | H01M 4/525 |

FOREIGN PATENT DOCUMENTS

| | | |
|---|---|---|
| CN | 1838468 | 9/2006 |
| CN | 101048892 | 10/2007 |
| CN | 101783417 | 7/2010 |
| CN | 101847709 | 9/2010 |
| CN | 101478042 | 12/2010 |
| CN | 102280614 | 12/2011 |
| CN | 103947032 | 7/2014 |
| CN | 104393267 | 3/2015 |
| CN | 104466186 | 3/2015 |
| CN | 104779377 | 7/2015 |
| CN | 104916811 | 9/2015 |
| CN | 105977447 | 9/2016 |
| CN | 106848383 | 6/2017 |
| CN | 111883815 | 11/2020 |
| CN | 111883816 | 11/2020 |
| CN | 111883819 | 11/2020 |
| EP | 1079455 | 2/2001 |
| EP | 1826842 | 8/2007 |
| EP | 2581977 | 4/2013 |
| EP | 2838142 | 2/2015 |
| EP | 2874215 | 5/2015 |
| EP | 3024083 | 5/2016 |
| EP | 3386003 | 10/2018 |
| JP | 2000-277148 | 10/2000 |
| JP | 2001-135359 | 5/2001 |
| JP | 2004-111157 | 4/2004 |
| JP | 2005-123185 | 5/2005 |
| JP | 2008-305783 | 12/2008 |
| JP | 4977079 | 7/2012 |
| JP | 2012-221672 | * 11/2012 |
| JP | 5213305 | 6/2013 |
| JP | 5110670 | 7/2014 |
| JP | 2015-115168 | 6/2015 |
| JP | 6197384 | 9/2017 |
| JP | 6271709 | 1/2018 |
| JP | 2018-106879 | * 7/2018 |
| JP | 2018-147672 | 9/2018 |
| JP | 2018-156854 | 10/2018 |
| JP | 2018-156876 | 10/2018 |
| JP | 2018156876 | 10/2018 |
| JP | 2019-087464 | 6/2019 |
| KR | 10-2000-0056339 | 9/2000 |
| KR | 10-2005-0035074 | 4/2005 |
| KR | 10-2005-0035281 | 4/2005 |
| KR | 10-2005-0121172 | 12/2005 |
| KR | 10-2008-0073371 | 8/2008 |
| KR | 10-1205375 | 3/2009 |
| KR | 10-2009-0106841 | 10/2009 |
| KR | 10-2010-0081950 | 7/2010 |
| KR | 10-2013-0104088 | 9/2013 |
| KR | 10-2013-0105449 | 9/2013 |
| KR | 10-2013-0116170 | 10/2013 |
| KR | 10-2014-0068893 | 6/2014 |
| KR | 10-2015-0020022 | 2/2015 |
| KR | 10-2015-0050974 | 5/2015 |
| KR | 10-2015-0129181 | 11/2015 |
| KR | 10-2015-0143334 | 12/2015 |
| KR | 10-2016-0024776 | 3/2016 |
| KR | 10-2016-0025052 | 3/2016 |
| KR | 10-2016-0029176 | 3/2016 |
| KR | 10-2016-0066518 | 6/2016 |
| KR | 10-2016-0110076 | 9/2016 |
| KR | 10-2016-0117689 | 10/2016 |
| KR | 10-2017-0060515 | 6/2017 |
| KR | 10-2017-0094720 | 8/2017 |
| KR | 10-2017-0109285 | 9/2017 |
| KR | 10-2017-0113645 | 10/2017 |
| KR | 10-2018-0014192 | 2/2018 |
| KR | 10-2018-0037121 | 4/2018 |
| KR | 10-2018-0038831 | 4/2018 |
| KR | 10-2018-0045724 | 5/2018 |
| KR | 10-2018-0049986 | 5/2018 |
| KR | 10-2018-0077190 | 7/2018 |
| KR | 10-2018-0081072 | 7/2018 |
| KR | 10-1876826 | 7/2018 |
| KR | 10-2018-0097036 | 8/2018 |
| KR | 10-2019-0043955 | 4/2019 |
| KR | 10-2019-0043957 | 4/2019 |
| KR | 10-2020-0044579 | 4/2020 |
| WO | 2006-132474 | 12/2006 |
| WO | 2011115247 | 7/2013 |

(56) References Cited

FOREIGN PATENT DOCUMENTS

| WO | 2014-103792 | 7/2014 |
|---|---|---|
| WO | 2018-012821 | 1/2018 |

OTHER PUBLICATIONS

Machine translation of JP 2012-221672, published on Nov. 12, 2012 (Year: 2012).*
Non-Final Office Action dated Apr. 27, 2022, issued to U.S. Appl. No. 16/862,638.
Office Action dated Nov. 9, 2021, issued to European Patent Application No. 19183919.0.
Notice of Allowance dated Sep. 2, 2021, issued to Korean Patent Application No. 10-2018-0160080.
Office Action dated Sep. 10, 2021, issued to U.S. Appl. No. 16/460,765.
Office Action dated Sep. 10, 2021, issued to U.S. Appl. No. 16/711,114.
Extended European Search Report dated Nov. 7, 2019 in European Patent Application No. 19183919.0.
Extended European Search Report dated Nov. 7, 2019 in European Patent Application No. 19183958.8.
Extended European Search Report dated Oct. 19, 2020, issued to European Patent Application No. 20172161.
Office Action and Search Report dated Feb. 9, 2022, issued to Chinese Patent Application No. 201910594666.
Office Action dated Feb. 17, 2022, issued to U.S. Appl. No. 16/862,779.
Office Action dated Feb. 17, 2022, issued to U.S. Appl. No. 16/460,765.
Notice of Refusal dated Mar. 11, 2021, issued to Korean Patent Application No. 10-2018-0160080.
Grant of Patent dated Mar. 25, 2021, issued to Korean Patent Application No. 10-2018-0077138.
Grant of Patent dated Mar. 25, 2021, issued to Korean Patent Application No. 10-2018-0077139.
Office Action dated Apr. 12, 2021, issued to U.S. Appl. No. 16/460,779.
Advisory Action and AFCP Decision dated Jan. 6, 2022 issued to U.S. Appl. No. 16/460,779.
Office Action dated Jan. 26, 2022 and Search Reported dated Jan. 21, 2022, issued to Chinese Patent Application No. 201901595050.
Non-Final Office Action dated Mar. 28, 2022, issued to U.S. Appl. No. 16/863,679.
Final Office Action dated Dec. 15, 2021, issued to U.S. Appl. No. 16/711,114.
Notice of Allowance dated Mar. 2, 2022, issued to U.S. Appl. No. 16/711,114.
Non-Final Office Action dated Apr. 1, 2022, issued to U.S. Appl. No. 16/864,384.
Extended European Search Report dated Aug. 3, 2020, issued to European Patent Application No. 20171859.0.
Extended European Search Report dated Aug. 3, 2020, issued to European Patent Application No. 20171551.3.
Extended European Search Report dated Aug. 3, 2020, issued to European Patent Application No. 20171450.8.
Extended European Search Report dated Aug. 3, 2020, issued to European Patent Application No. 20171833.5.
Extended European Search Report dated Aug. 3, 2020, issued to European Patent Application No. 20171846.7.
Extended European Search Report dated Aug. 3, 2020, issued to European Patent Application No. 20172132.1.
Office Action dated Mar. 4, 2021, issued to U.S. Appl. No. 16/460,765.
Final Office Action dated Oct. 22, 2021, issued to U.S. Appl. No. 16/460,779.
Advisory Action dated Nov. 17, 2021, issued to U.S. Appl. No. 16/460,765.
Final Office Action dated Jun. 7, 2022, issued to U.S. Appl. No. 16/862,779.
Non-Final Office Action dated May 3, 2022, issued to U.S. Appl. No. 16/864,294.
Non-Final Office Action dated Jun. 28, 2022, issued to U.S. Appl. No. 16/864,858.
Notice of Allowance dated Aug. 1, 2022, of U.S. Appl. No. 16/864,384.
Office Action dated Aug. 23, 2022, of Chinese.Patent Application No. 201911266005.8.
Notice of Allowance dated Aug. 8, 2022, of U.S. Appl. No. 16/862,638.
Jing Wang, et al., "Thermal Synergy Effect between LiNi0.5Co0.2Mn0.3O2 and LiMn2O4 Enhances the Safety of Blended Cathode for Lithium Ion Batteries", ACS Appl. Mater. Interfaces 2016, 8, pp. 20147-20156 (Jul. 22, 2016).
Notice of Allowance dated Jul. 11, 2022, of Korean Patent Application No. 10-2019-0052572.
Notice of Allowance dated Jul. 11, 2022, of Korean Patent Application No. 10-2019-0052574.
Office Action dated Jul. 13, 2022, of Korean Patent Application No. 10-2019-0052571.
Notice of Allowance dated Jul. 13, 2022, of Korean Patent Application No. 10-2019-0052570.
Office Action dated Jul. 13, 2022, of Korean Patent Application No. 10-2019-0052573.
Notice of Allowance dated Jul. 13, 2022, of U.S. Appl. No. 16/460,779.
Office Action dated Jul. 22, 2022, of European Patent Application No. 20172161.0.
Notice of Allowance dated Jul. 20, 2022, of U.S. Appl. No. 16/863,679.
Final Office Action dated Sep. 23, 2022, issued to U.S. Appl. No. 16/460,765.
Notice of Allowance dated Oct. 5, 2022, issued to Korean Patent Application No. 10-2019-0052569.
Notice of Allowance dated Oct. 5, 2022, issued to Korean Patent Application No. 10-2019-0052568.
Final Office Action dated Aug. 30, 2022, issued to U.S. Appl. No. 16/864,294.
Notice of Allowance dated Aug. 15, 2022, issued to U.S. Appl. No. 16/862,77.
Office Action dated Dec. 22, 2022, of the cross-referenced U.S. Appl. No. 16/460,765.
Notice of Allowance dated Dec. 28, 2022 of Korean Patent Application No. 10-2019-0052573.
Notice of Allowance dated Oct. 26, 2022, issued to U.S. Appl. No. 16/864,858.
Notice of Allowance dated Oct. 13, 2022, for U.S. Appl. No. 16/864,858.
Office Action dated Dec. 5, 2022 (including a Search Report dated Nov. 29, 2022) of the corresponding Chinese Patent Application No. 202010369783.6.
Notice of Allowance dated Dec. 21, 2022, for U.S. Appl. No. 16/460,779.
Advisory Action dated Dec. 5, 2022, for U.S. Appl. No. 16/864,294.
Notice of Allowance dated Mar. 1, 2023, issued to U.S. Appl. No. 16/460,779.

* cited by examiner

RECHARGEABLE LITHIUM BATTERY

CROSS-REFERENCE TO RELATED APPLICATION

This application claims priority to and the benefit of Korean Patent Application No. 10-2019-0052571 filed in the Korean Intellectual Property Office on May 3, 2019, which is hereby incorporated by reference for all purpose as if fully set forth herein. Further, two related co-pending applications were filed on Jul. 2, 2019 with United States Patent and Trademark Office, as U.S. patent application Ser. No. 16/460,765 and U.S. patent application Ser. No. 16/460,779, both of which are hereby incorporated by reference for all purposes as if fully set forth herein, but are not admitted to be prior art with respect to the present invention by their mention in the cross-reference section.

BACKGROUND OF THE INVENTION

Field

Exemplary embodiments/implementations of the invention relate generally to a rechargeable lithium battery.

Discussion of the Background

A portable information device such as a cell phone, a laptop, smart phone, and the like or an electric vehicle has used a rechargeable lithium battery having high energy density and easy portability as a driving power source. In addition, research on use of a rechargeable lithium battery as a power source for a hybrid or electric vehicle or a power storage by using high energy density characteristics has recently been actively made.

One of the main research tasks of such a rechargeable lithium battery is to improve the safety of the rechargeable battery. For example, if the rechargeable lithium battery is exothermic due to internal short circuit, overcharge and over-discharge, and the like, and an electrolyte decomposition reaction and thermal runaway phenomenon occur, an internal pressure inside the battery may rise rapidly to cause battery explosion. Among these, when the internal short circuit of the rechargeable lithium battery occurs, there is a high risk of explosion because the high electrical energy stored in each electrode is conducted in the shorted positive electrode and negative electrode.

In addition to the damage of the rechargeable lithium battery, the explosion may cause fatal damages to the user. Therefore, it is urgent to improve stability of the rechargeable lithium battery.

On the other hand, a finely pulverized active material may be applied in order to increase energy density. However, when the finely pulverized active material is applied, conductivity is lowered, so that power characteristics may be lowered. In order to improve these, a conductive material may be added, but battery capacity may be deteriorated.

The above information disclosed in this Background section is only for understanding of the background of the inventive concepts, and, therefore, it may contain information that does not constitute prior art.

SUMMARY

Devices constructed/methods according to exemplary implementations embodiments of the invention are a rechargeable lithium battery capable of having high capacity and high power.

According to one or more implementations/embodiments of the invention, a rechargeable lithium battery includes a negative electrode including a negative current collector, a negative active material layer disposed on the negative current collector, and a negative electrode functional layer disposed on the negative active material layer; and positive electrode including a positive current collector and a positive active material layer disposed on the positive current collector, wherein the negative electrode functional layer includes flake-shaped polyethylene particles, the positive active material layer includes a first positive active material including at least one of a composite oxide of a metal selected from cobalt, manganese, nickel, and a combination thereof and lithium, a second positive active material including a compound represented by Chemical Formula 1, and carbon nanotubes, and the carbon nanotubes may have an average length of 30 μm to about 100 μm.

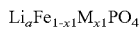
[Chemical Formula 1]

wherein, $0.90 \leq a \leq 1.8$, $0 \leq x1 \leq 0.7$, and M is Mn, Co, Ni, or a combination thereof.

As the reaction rate is improved according to a temperature, an early shut-down function may be implemented, thereby enabling high capacity and high power characteristics of the rechargeable lithium battery.

Additional features of the inventive concepts will be set forth in the description which follows, and in part will be apparent from the description, or may be learned by practice of the inventive concepts.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION OF THE EMBODIMENTS

Figure 1:
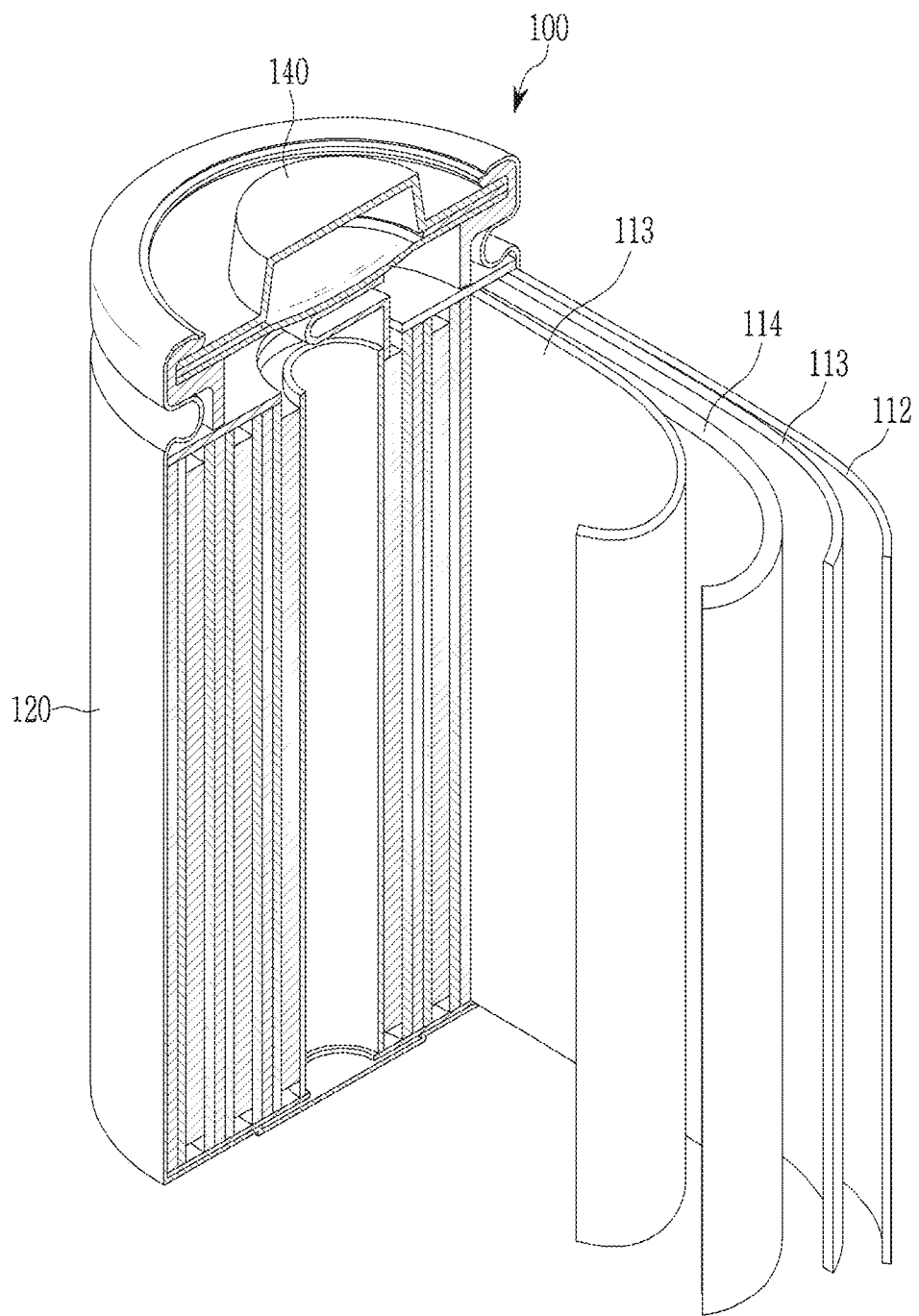
FIG. 1 schematically shows a structure of a rechargeable lithium battery according to an embodiment of the present disclosure.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, referring to the drawings, embodiments of the present invention are described in detail. In the following description of the present disclosure, the well-known functions or constructions will not be described in order to clarify the present disclosure.

In order to clearly illustrate the present disclosure, the description and relationships are omitted, and throughout the disclosure, the same or similar configuration elements are designated by the same reference numerals. Also, since the size and thickness of each configuration shown in the drawing are arbitrarily shown for better understanding and ease of description, the present disclosure is not necessarily limited thereto.

A rechargeable lithium battery may be classified into a lithium ion battery, a lithium ion polymer battery, and a lithium polymer battery depending on kinds of a separator and an electrolyte. It also may be classified to be cylindrical, prismatic, coin-type, pouch-type, and the like, depending on shapes. In addition, it may be a bulk type and a thin film type depending on sizes. Structures and manufacturing methods for lithium ion batteries pertaining to this disclosure are well known in the art.

Hereinafter, as an example of a rechargeable lithium battery, a cylindrical rechargeable lithium battery is for example described. FIG. 1 schematically shows a structure of a rechargeable lithium battery according to an embodiment. Referring to FIG. 1, a rechargeable lithium battery 100 according to an embodiment includes a battery cell including a positive electrode 114, a negative electrode 112 facing the positive electrode 114, a separator 113 disposed between the positive electrode 114 and the negative electrode 112, and an electrolyte (not shown) impregnating the positive electrode 114, negative electrode 112, and separator 113, a battery case 120 containing the battery cell, and a sealing member 140 sealing the battery case 120.

Hereinafter, a detailed configuration of the rechargeable lithium battery 100 according to an embodiment of the present invention is described.

A rechargeable lithium battery according to an embodiment includes a positive electrode and a negative electrode, and the positive electrode includes a positive current collector and a positive active material layer disposed on the positive current collector, and the positive active material layer may include a first positive active material, a second positive active material, and carbon nanotubes.

The carbon nanotubes may include at least one of single-walled carbon nanotubes, double-walled carbon nanotubes, and multi-walled carbon nanotubes. Among them, the single-walled and double-walled carbon nanotubes may increase dispersibility of slurry including the same, and when formed into an active material layer, excellent processability such as coating and the like and simultaneously, excellent conductivity of the active material layer may be secured.

The carbon nanotubes may have an average length in a range of about 30 μm to about 100 μm.

For example, the average length of the carbon nanotubes may be specifically in a range of about 30 μm to about 90 μm, for example, about 30 μm to about 80 μm.

The average length of carbon nanotubes within this range may reduce electrode plate resistance, and thereby, achieving a long cycle-life rechargeable battery.

In an embodiment, the carbon nanotubes may have an average diameter in a range of about 1 nm to about 20 nm, specifically, about 1 nm to about 15 nm, and for example, about 10 nm to about 15 nm.

When the average diameter of carbon nanotubes is within the range, there is an effect of reducing the electrode plate resistance.

The average length and the average diameter of carbon nanotubes may be measured by using a field emission scanning electron microscope.

In an embodiment, an average length/average diameter ratio of the carbon nanotubes may be in a range of about 1,000 to about 5,400, specifically, about 2,000 to about 5,400, or for example, about 3,000 to about 5,400.

The average length/average diameter ratio is defined as a ratio of a long axis length crossing the center of a carbon nanotube unit and a diameter thereof vertical to the long axis, and herein, the carbon nanotubes according to an embodiment have an average length/average diameter ratio within the range and thus may be carbon nanotubes having a relatively high average length/average diameter ratio, that is, carbon nanotubes extended in a length direction.

When these carbon nanotubes having a high average length/average diameter ratio are included, a specific surface area of the carbon nanotubes may be increased, and thereby a contact area thereof with an active material may be increased, and resultantly, conductivity may be improved, and thus power characteristics may be improved.

In addition, the carbon nanotubes may replace a conductive material, and accordingly, a use amount of the conductive material is decreased, thereby, preventing capacity degradation caused by a decreased fraction of the active material.

In an embodiment, the carbon nanotubes may be included in an amount of about 0.1 wt % to about 2 wt %, for example, about 0.5 wt % to about 1.2 wt %, based on a total weight of the positive active material layer.

When the amount of the carbon nanotubes is in the above range, the amount of a dispersing agent dispersing the carbon nanotubes may be adjusted appropriately, and a resistance increase due to an increase in the amount of the dispersing agent may be alleviated, thereby preventing reducing of the battery performance.

The positive active material layer may optionally further include a positive electrode conductive material and a positive electrode binder.

The amounts of the positive electrode conductive material and the positive electrode binder may be about 1 wt % to about 5 wt % based on a total weight of the positive active material layer, respectively.

The positive electrode conductive material is used to impart conductivity to the positive electrode, and may be used as long as it is an electron conductive material without causing chemical change in the battery. Examples of the conductive material may include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

In an embodiment, the positive electrode conductive material may be included along with the carbon nanotubes and specifically, included in an amount of less than about 1 wt %, for example, about 0.1 wt % to about 0.6 wt % based on a total weight of the positive active material layer.

According to an embodiment, when carbon nanotubes having a high average length/average diameter ratio together with the positive electrode conductive material are used, a use amount of the positive active material is slowly decreased, compared with when carbon nanotubes having a low average length/average diameter ratio (or referred to as an aspect ratio), and accordingly, the capacity degradation may be improved.

The first positive active material may include at least one composite oxides of a metal selected from cobalt, manganese, nickel, and a combination thereof, and lithium and the second positive active material may include a compound represented by Chemical Formula 1.

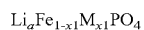  [Chemical Formula 1]

wherein, 0.90≤a≤1.8, 0≤x1x.0.7, and M is Mn, Co, Ni, or a combination thereof.

In an embodiment, the first positive active material and the second positive active material may be included in an amount of about 80 wt % to about 99 wt %, and specifically about 80 wt % to about 98 wt %, for example about 80 wt % to about 97 wt % based on a total weight of the positive active material layer.

In this case, the first positive active material and the second positive active material may be included in a weight ratio of about 97:3 to about 80:20, specifically about 95:5 to about 85:15 or about 95:5 to about 90:10.

When the amounts of the first positive active material and the second positive active material satisfies the above range, safety may be improved without lowering capacity.

The positive active material layer may further include a positive electrode functional layer disposed on the positive active material layer.

The first positive active material may be included in the positive active material layer, and the second positive active material may be included in at least one of the positive active material layer and the positive electrode functional layer.

The first positive active material may specifically include one of $LiCoO_2$, $Li_bM^1_{1-y}1$-$z1M^2_y1M^3_z1O_2$ (0.9z1st positive active material may sand $M^1$, $M^2$, and $M^3$ are independently a metal of Ni, Co, Mn, Al, Sr, Mg, or La), and a combination thereof.

For example, the first positive active material may include $LiCoO_2$, but is not limited thereto.

For example, $M^1$ may be Ni, and $M^2$ and $M^3$ may independently be a metal such as Co, Mn, Al, Sr, Mg, or La.

More specifically, $M^1$ may be Ni, $M^2$ may be Co, and $M^3$ may be Mn or Al, but are not limited thereto.

The second positive active material may include $LiFePO_4$.

The average particle diameter of the first positive active material may be about 10 μm to about 30 μm, specifically about 10 μm to about 25 μm, for example, about 13 μm to about 20 μm.

The average particle diameter of the second positive active material may be about 300 nm to about 700 nm, specifically about 300 nm to about 600 nm, and for example, about 300 nm to about 500 nm.

When the average particle diameters of the first positive active material and the second positive active material are within the above range, energy density may be increased to implement a high capacity of the rechargeable battery.

The positive current collector may include aluminum, nickel, and the like, but is not limited thereto.

The positive electrode binder adheres positively to the positive active material particles, and also serves to adhere the positive active materials to the current collector well. Examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The electrolyte includes a non-aqueous organic solvent and a lithium salt.

The non-aqueous organic solvent serves as a medium for transporting ions taking part in the electrochemical reaction of a battery.

The non-aqueous organic solvent may include a carbonate-based, ester-based, ether-based, ketone-based, alcohol-based, or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like and the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and the like. The ether-based solvent may include dibutyl ether, tetraglyme, diglyme, dimethoxyethane, 2-methyltetrahydrofuran, tetrahydrofuran, and the like and the ketone-based solvent may include cyclohexanone, and the like. The alcohol-based solvent include ethyl alcohol, isopropyl alcohol, and so on, and examples of the aprotic solvent include nitriles such as R—CN (wherein R is a C2 to C20 linear, branched, or cyclic hydrocarbon group that may include a double bond, an aromatic ring, or an ether bond), amides such as dimethylformamide, dioxolanes such as 1,3-dioxolane, sulfolanes, and so on.

The non-aqueous organic solvent may be used alone or in a mixture of two or more. When the organic solvent is used in a mixture, the mixture ratio can be controlled in accordance with a desirable battery performance.

The carbonate-based solvent may include a mixture of a cyclic carbonate and a chain carbonate. The cyclic carbonate and the chain carbonate are mixed together at a volume ratio of about 1:1 to about 1:9, and when the mixture is used as an electrolyte, the electrolyte performance may be enhanced.

The non-aqueous organic solvent of the present disclosure may further include an aromatic hydrocarbon-based organic solvent in addition to the carbonate-based solvent. In this case, the carbonate-based solvent and the aromatic hydrocarbon-based organic solvent may be mixed in a volume ratio of about 1:1 to about 30:1.

As the aromatic hydrocarbon-based organic solvent, an aromatic hydrocarbon-based compound of Chemical Formula 2 may be used.

[Chemical Formula 2]

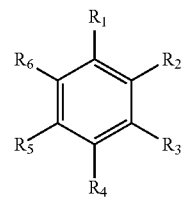

In Chemical Formula 2, $R_1$ to $R_6$ are the same or different and are selected from hydrogen, a halogen, a C1 to C10 alkyl group, a haloalkyl group, and a combination thereof.

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The non-aqueous electrolyte may further include vinylene carbonate or an ethylene carbonate-based compound of Chemical Formula 3 in order to improve cycle-life of a battery.

[Chemical Formula 3]

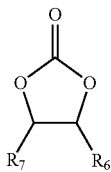

In Chemical Formula 3, $R_7$ and $R_8$ may be the same or different and may be selected from hydrogen, a halogen group, a cyano group (CN), a nitro group ($NO_2$), and a fluorinated C1 to C5 alkyl group, wherein at least one of $R_7$ and $R_8$ is selected from a halogen group, a cyano group (CN), nitro group ($NO_2$), and a fluorinated C1 to C5 alkyl group, provided that $R_7$ and $R_8$ are not both hydrogen.

Examples of the ethylene carbonate-based compound may include difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the cycle-life improvement additive may be used within an appropriate range.

The lithium salt dissolved in an organic solvent supplies a battery with lithium ions, basically operates the rechargeable lithium battery, and improves transportation of the lithium ions between a positive electrode and a negative electrode. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlO_2$, $LiAlCl_4$, $LiN(C_xF_{2x+1}SO_2)(C_yF_{2y+1}SO_2)$ wherein, x and y are natural numbers, LiCl, LiI, and $LiB(C_2O_4)_2$ (lithium bis(oxalato) borate, LiBOB). A concentration of the lithium salt may range from about 0.1 M to about 2.0 M. When the lithium salt is included at the above concentration range, an electrolyte may have excellent performance and lithium ion mobility due to optimal electrolyte conductivity and viscosity.

The negative electrode may include a negative current collector, a negative active material layer disposed on the negative current collector, and a negative electrode functional layer disposed on the negative active material layer, and the negative electrode functional layer may include flake-shaped polyethylene particles.

The polyethylene is generally HDPE (high density polyethylene, density: about 0.94 g/cc to about 0.965 g/cc), MDPE (medium density polyethylene, density: about 0.925 g/cc to about 0.94 g/cc), LDPE (low density polyethylene, density: about 0.91 g/cc to about 0.925 g/cc), VLDPE (very low density polyethylene, density: about 0.85 g/cc to about 0.91 g/cc), and the like.

The flake-shaped polyethylene particles may be used alone or in combination of two or more polyethylene polymers such as HDPE, MDPE, or LDPE.

The average particle size (D50) of the flake-shaped polyethylene particles included in the negative electrode functional layer disposed on the negative active material layer may be about 1 μm to about 8 μm, and specifically about 2 μm to about 6 μm.

As used herein, when a definition is not otherwise provided, the average particle size (D50) may be measured by a well-known method for a person of an ordinary skill in the art, for example, as a particle size analyzer, or from TEM or SEM photographs. Alternatively, a dynamic light-scattering measurement device is used to perform a data analysis, and the number of particles is counted for each particle size range. From this, the (D50) value may be easily obtained through a calculation.

On the other hand, a ratio of the long axis length relative to the short axis length of the flake-shaped polyethylene particles may be about 1 to about 5, specifically about 1.1 to about 4.5, for example about 1.2 to about 3.5.

In addition, a thickness of the flake-shaped polyethylene particles may be about 0.2 μm to about 4 μm, specifically, about 0.3 μm to about 2.5 μm, for example may be about 0.3 μm to about 1.5 μm.

Figure 2:
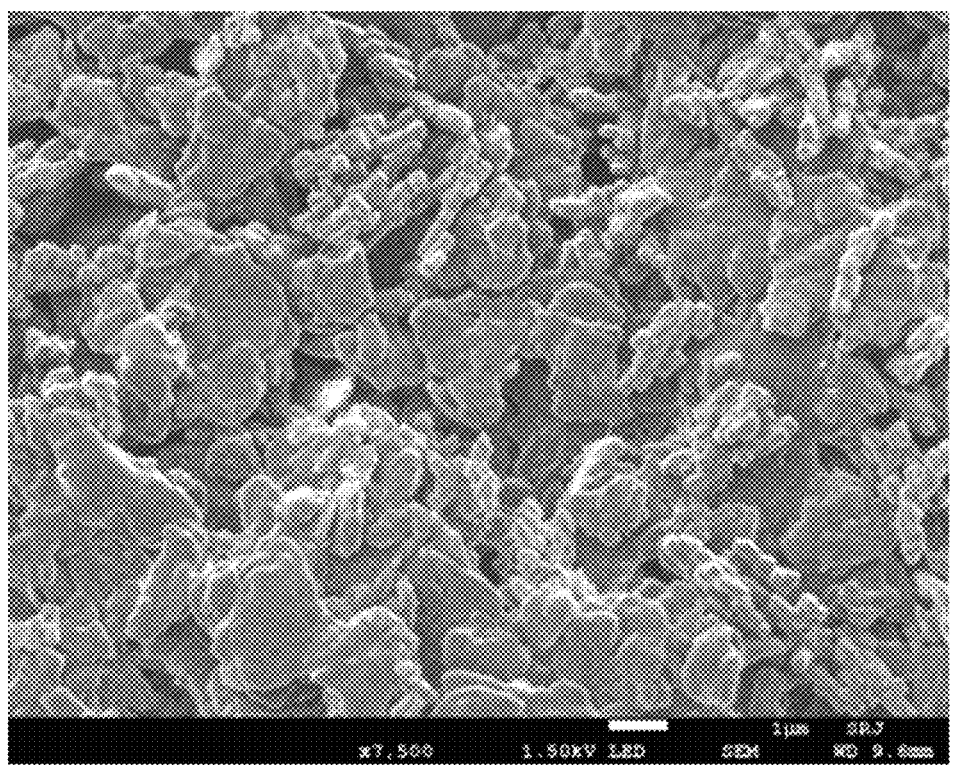
FIG. 2 is a SEM photograph of polyethylene particles of a negative electrode functional layer according to an embodiment.

The polyethylene particles according to this disclosure are flake-shaped, as seen in FIG. 2, and the average particle size may be defined as (D50) described above.

When the size and thickness of the flake-shaped polyethylene particles are within the above range, ion channels may be effectively closed even in a small amount.

When the negative electrode functional layer including the flake-shaped polyethylene particles is provided, a reaction rate may be increased according to temperature under the same reaction conditions, compared with the case of including spherical polyethylene particles, thereby improving stability improvement effect of the rechargeable lithium battery. In the case of the flake-shaped polyethylene particles before melting, an area covering pores is thinner and wider than that of the spherical shape polyethylene particles before melting. When the polyethylene particles are melted at a predetermined temperature or more to close ion channels, a reaction rate is faster because the flake-shaped polyethylene particles have a larger area than that of the electrode plate closed by the melted spherical polyethylene particles.

That is, the polyethylene particles included in the negative electrode functional layer during thermal runaway of the battery is melted to close the ion channels, thereby limiting the movement of the ions to implement a shut-down function may prevent additional electrochemical reactions.

Figure 3:
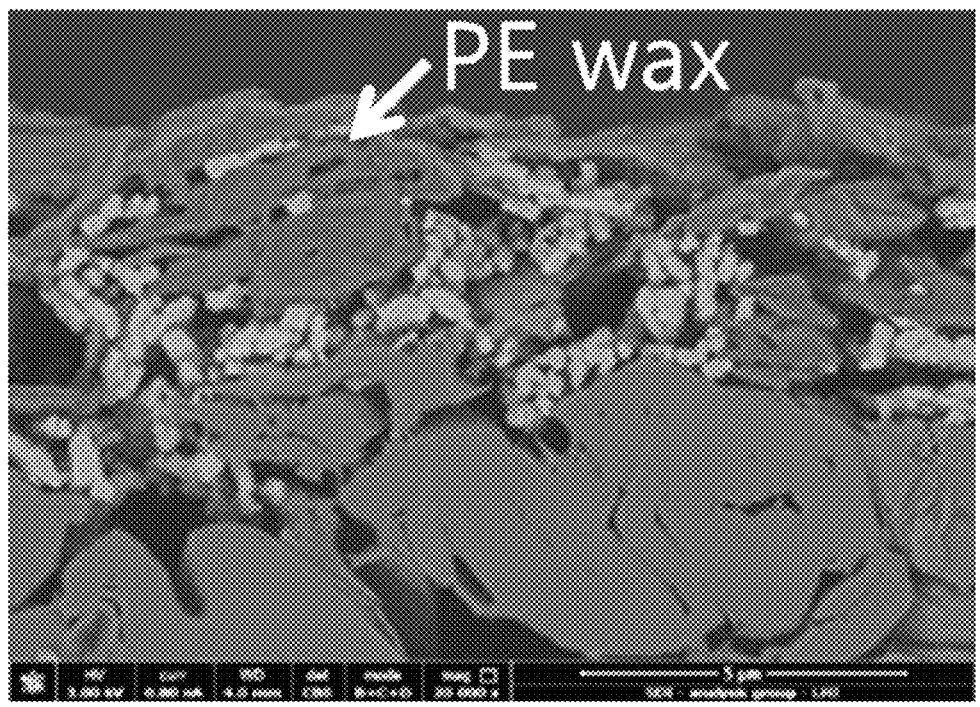
FIG. 3 is a SEM photograph of a negative electrode composition according to an embodiment.

For example, as shown in FIG. 3, since the flake-shaped polyethylene particles according to the embodiment are disposed in a thin and wide shape on the pores in a composition for the negative electrode functional layer, the flake-shaped polyethylene particles melts more rapidly during thermal runaway due to thermal/physical impact, thereby suppressing passage of ions.

The negative electrode functional layer may further include inorganic particles and a binder.

A sum amount of the flake-shaped polyethylene particles and the inorganic particles: an amount of the binder may be included in a weight ratio of about 80:20 to about 99:1, and specifically, a weight ratio of about 85:15 to about 97:3.

The flake-shaped polyethylene particles and the inorganic particles may be included in a weight ratio of about 95:5 to about 10:90, and specifically in a weight ratio of about 30:70 to about 70:30.

When the amounts of the flake-shaped polyethylene particles and the inorganic particles are in the above range, cycle-life characteristics and power characteristics of a battery may be secured.

The inorganic particles may include, for example, $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, or a combination thereof, but are not limited thereto. Organic particles such as an acrylic compound, an imide compound, an amide compound, or a combination thereof may be further included in addition to the inorganic particles, but are not limited thereto.

The inorganic particles may be spherical, flake-shaped, cubic, or amorphous. The inorganic particles may have an average particle diameter of about 1 nm to about 2500 nm, for example about 100 nm to about 2000 nm, about 200 nm to about 1000 nm, or about 300 nm to about 800 nm. The average particle diameter of the inorganic particle may be an average particle size ($D_{50}$) at a volume ratio of 50% in a cumulative size-distribution curve.

The negative electrode functional layer may have a thickness of about 1 μm to about 10 μm, and specifically about 3 μm to about 10 μm.

In addition, a ratio of the thickness of the negative active material layer to the thickness of the negative electrode functional layer may be about 50:1 to about 10:1, and specifically about 30:1 to about 10:1.

When the thickness of the negative electrode functional layer is within the above range, the thermal stability may be significantly improved while maintaining excellent cycle-life characteristics.

In particular, when the ratio of the thickness of the negative electrode functional layer is included in the above range, thermal safety may be improved while minimizing the decrease in energy density.

The negative current collector may include one selected from a copper foil, a nickel foil, a stainless steel foil, a titanium foil, a nickel foam, a copper foam, a polymer substrate coated with a conductive metal, and a combination thereof.

The negative active material may include a material that reversibly intercalates/deintercalates lithium ions, a lithium metal, a lithium metal alloy, a material capable of doping/dedoping lithium, or a transition metal oxide.

Examples of the material capable of reversibly intercalating/deintercalating the lithium ions may include a carbonaceous material, that is, a carbon-based negative active material generally used in a rechargeable lithium battery. Examples of the carbon-based negative active material may be crystalline carbon, amorphous carbon, or a combination thereof. The crystalline carbon may be graphite such as non-shaped, sheet-shaped, flake-shaped, spherical shape, or fiber shaped natural graphite or artificial graphite, and the amorphous carbon may be a soft carbon, a hard carbon, a mesophase pitch carbonization product, fired coke, and the like.

The lithium metal alloy includes an alloy of lithium and a metal selected from Na, K, Rb, Cs, Fr, Be, Mg, Ca, Sr, Si, Sb, Pb, In, Zn, Ba, Ra, Ge, Al, and Sn.

The material capable of doping/dedoping lithium may be a silicon-based material or tin-based material, for example, Si, $SiO_x$ ($0<x<2$), a Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof, but not Si), a Si-carbon composite, Sn, $SnO_2$, a Sn—R alloy (wherein R is an element selected from an alkali metal, an alkaline-earth metal, a Group 13 element, a Group 14 element, a Group 15 element, a Group 16 element, a transition metal, a rare earth element, and a combination thereof, but not Sn), a Sn-carbon composite and the like. At least one of these materials may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and a combination thereof.

The transition metal oxide may include a lithium titanium oxide.

In the negative active material layer, an amount of the negative active material is about 95 wt % to about 99 wt % based on a total weight of the negative active material layer.

The negative active material layer may optionally further include a negative electrode conductive material and a negative electrode binder.

Each amount of the negative electrode conductive material and negative electrode binder may be about 1 wt % to about 5 wt % based on a total weight of the negative active material layer.

The negative electrode conductive material is used to impart conductivity to the negative electrode, and types of the negative electrode conductive material is the same as types of the positive electrode conductive material described above.

The negative electrode binder improves binding properties of negative active material particles with one another and with a current collector. The negative electrode binder may be a non-water-soluble binder, a water-soluble binder, an amphiphilic binder (water-soluble/non-water-soluble binder), or a combination thereof.

The non-water-soluble binder may be polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may be a styrene-butadiene rubber, an acrylated styrene-butadiene rubber, polyvinyl alcohol, sodium polyacrylate, a copolymer of propylene and a C2 to C8 olefin, a copolymer of (meth)acrylic acid and (meth)acrylic acid alkyl ester, or a combination thereof.

The amphiphilic binder may be an acrylated styrene-based rubber.

When the water-soluble binder is used as a negative electrode binder, a cellulose-based compound may be further used to provide viscosity as a thickener. The cellulose-based compound includes one or more of carboxylmethyl cellulose, hydroxypropylmethyl cellulose, methyl cellulose, or alkali metal salts thereof. The alkali metals may be Na, K, or Li. The thickener may be included in an amount of about 0.1 parts by weight to about 3 parts by weight based on 100 parts by weight of the negative active material.

The rechargeable lithium battery according to an embodiment of the present invention simultaneously includes the positive active material layer including the first and second positive active materials and the carbon nanotubes having a high average length/average diameter ratio along with the negative electrode functional layer disposed on a negative electrode, and thus there are effects of decreasing a heat-increasing rate according to thermal/physical impacts and helping the flake-shaped polyethylene particles melt and completely blocking an ion passage. In addition, a high capacity and high power rechargeable lithium battery may be realized.

On the other hand, the separator 113 may be disposed between the positive electrode 111 and the negative electrode 112 as described above. The separator 113 may be, for example, selected from a glass fiber, polyester, polyethylene, polypropylene, polytetrafluoroethylene, or a combination thereof. It may have a form of a non-woven fabric or a woven fabric. For example, in a rechargeable lithium battery, a polyolefin-based polymer separator such as polyethylene and polypropylene is mainly used. In order to ensure the heat resistance or mechanical strength, a coated separator including a ceramic component or a polymer material may be used. Optionally, it may have a mono-layered or multi-layered structure.

Hereinafter, the above aspects of the present disclosure are illustrated in more detail with reference to examples. However, these examples are exemplary, and the present disclosure is not limited thereto.

(Manufacture of Rechargeable Lithium Battery Cells)

EXAMPLE 1

96 wt % of a positive active material prepared by mixing $LiCoO_2$ (an average particle diameter (D50)=17 μm)/ $LiFePO_4$ (an average particle diameter (D50)=400 nm) in a weight ratio of 9:1 as first/second positive active materials, 3 wt % of a polyvinylidene fluoride binder, and 1 wt % of carbon nanotube (CNT) 1 (an average diameter: 15 nm, an average length: 60 μm, an average length/average diameter ratio: 4000) were mixed in an N-methylpyrrolidone solvent to prepare positive active material slurry. The positive active material slurry was coated on both surfaces of an aluminum current collector and then, dried and compressed to manufacture a positive electrode having a positive active material layer.

98 wt % of graphite, 0.8 wt % of carboxylmethyl cellulose, and 1.2 wt % of a styrene-butadiene rubber were mixed in pure water to prepare negative active material slurry. The negative active material slurry was coated on both surfaces of a copper current collector and then, dried and compressed to manufacture a negative electrode having a negative active material layer.

48 wt % of 2 μm flake-shaped PE particles (a long axis length/a short axis length=about 2, a thickness=about 0.6 μm), 47 wt % of alumina (an average particle diameter (D50)=0.7 μm), and 5 wt % of an acrylated styrene-based rubber binder were mixed in an alcohol-based solvent to prepare PE/alumina slurry.

The PE/alumina slurry was coated on both surface of the negative electrode and then, dried and compressed to manufacture a negative electrode having a coating layer including the flake-shaped PE particles.

The positive electrode, a separator consisting of a PE/PP multi-layer, and the negative electrode having a coating layer including the flake-shaped PE particles were sequentially stacked to manufacture an electrode assembly having a structure shown in FIG. 1, and an electrolyte (1.0 M $LiPF_6$ in EC/DEC=50:50 v/v) was injected thereinto to manufacture a rechargeable battery cell.

EXAMPLE 2

A rechargeable battery cell was manufactured according to the same method as Example 1 except that 95.6 wt % of a positive active material prepared by mixing LCO (an average particle diameter (D50)=17 μm)/LFP (an average particle diameter (D50)=400 nm) in a weight ratio of 9:1 as first/second positive active materials, 3 wt % of a polyvinylidene fluoride binder, 1 wt % of CNT 1, and 0.4 wt % of a ketjen black conductive material were used to manufacture a positive electrode.

EXAMPLE 3

A rechargeable battery cell was manufactured according to the same method as Example 1 except that CNT 2 (an average diameter: 15 nm, an average length: 40 μm, an average length/average diameter ratio: 2667) was used to manufacture a positive electrode.

COMPARATIVE EXAMPLE 1

A rechargeable battery cell was manufactured according to the same method as Example 1 except that CNT 3 (an average diameter: 30 nm, an average length: 20 μm, an average length/average diameter ratio: 667) instead of CNT 1 was used to manufacture a positive electrode.

COMPARATIVE EXAMPLE 2

A rechargeable battery cell was manufactured according to the same method as Example 1 except that 1 wt % of CNT 3, 1 wt % of a ketjen black conductive material, 3 wt % of a polyvinylidene fluoride binder, and 95 wt % of a positive active material were used to manufacture a positive electrode.

EVALUATION EXAMPLES

1. Resistivity of Electrode Plate

Four probe tips were aligned at a distance of 1 mm on a straight line to contact the surface of an electrode plate, and a predetermined current was supplied to the external probe tips to measure potential difference of the internal probe tips and thus obtain resistances. The resistance was multiplied with a thickness of the electrode plate and a correction factor to obtain resistivity.

The results are shown in Table 1.

$$\text{Resistance} = \text{Voltage}/\text{Current}$$

$$\text{Sheet resistance } (\Omega/sq) = \text{resistance} \times \text{correction factor}$$

$$\text{Resistivity } (\Omega \cdot m) = \text{sheet resistance} \times \text{electrode plate thickness} \quad \text{[Calculation Equation 1]}$$

TABLE 1

| | Resistivity (Ω · m) |
|---|---|
| Comparative Example 1 | 73.52 |
| Example 1 | 41.28 |

Referring to Table 1, Example 1 of using CNT having a high average length/average diameter ratio imparts electrical conductive characteristics to a positive electrode material due to lower electrical resistivity than Comparative Example 1 of using CNT having a low average length/average diameter ratio and thus may secure high power characteristics of a rechargeable battery cell as well as reduce electrode plate resistance.

2. Energy Density

Energy density (Wh/L) calculated by using discharge capacity (mAh) of a battery cell realizing an average discharge voltage of 3.6 V with respect to a predetermined volume (17 cm³) is shown in Table 2.

$$\text{Energy density (Wh/L)} = \text{battery capacity (mAh)} \times \text{average discharge voltage (V)}/\text{battery volume (L)} \quad \text{[Calculation Equation 2]}$$

TABLE 2

| | Resistivity (Ω·m) | Active material fraction (%) | Amount of conductive material | Discharge capacity (mAh) | Energy Density (Wh/L) |
|---|---|---|---|---|---|
| Comparative Example 2 | 73.52 | 95.0% | 1.00% | 3000 | 635 |
| Example 2 | 70.23 | 95.6% | 0.40% | 3020 | 640 |

Referring to Table 2, when a conductive material is used along with CNT having a high average length/average diameter ratio, an amount of the conductive material is reduced without decreasing electrical conductivity, and a positive active material may be more used as much as the decreased fraction of the conductive material and thus may realize high energy density.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A rechargeable lithium battery, comprising:
a negative electrode comprising:
a negative current collector;
a negative active material layer disposed on the negative current collector; and
a negative electrode functional layer disposed on the negative active material layer; and
a positive electrode comprising:
a positive current collector; and
a positive active material layer disposed on the positive current collector,
wherein the negative electrode functional layer comprises:
flake-shaped polyethylene particles,
wherein the positive active material layer comprises:
a first positive active material comprising at least one of a composite oxide of a metal selected from cobalt, manganese, nickel, and a combination thereof and lithium;
a second positive active material including a compound represented by Chemical Formula 1,

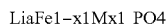

wherein, in Chemical Formula 1, 0.90≤a≤1.8, 0≤x1≤0.7, and M is Mn, Co, Ni, or a combination thereof; and
carbon nanotubes, which have an average length of 30 μm to about 100 μm,
wherein an aspect ratio of average length over average diameter of the carbon nanotubes is 1,000 to 5,400.

2. The rechargeable lithium battery of claim 1, wherein the carbon nanotubes have an average diameter of about 1 nm to about 20 nm.

3. The rechargeable lithium battery of claim 1, wherein the carbon nanotubes are included in an amount of about 0.1 wt % to about 2 wt % based on a total weight of the positive active material layer.

4. The rechargeable lithium battery of claim 1, wherein the positive active material layer further comprises a positive electrode conductive material.

5. The rechargeable lithium battery of claim 4, wherein the positive electrode conductive material is included in an amount of less than about 1 wt % based on a total weight of the positive active material layer.

6. The rechargeable lithium battery of claim 1, wherein the first positive active material and the second positive active material are included in an amount of about 80 wt % to about 99 wt % based on a total weight of the positive active material layer.

7. The rechargeable lithium battery of claim 1, wherein the first positive active material and second positive active material are included in a weight ratio of about 97:3 to about 80:20.

8. The rechargeable lithium battery of claim 1, wherein the positive active material layer further comprises a positive electrode functional layer disposed on the positive active material layer.

9. The rechargeable lithium battery of claim 8, wherein
the first positive active material is included in the positive active material layer, and
the second positive active material is included in at least one of the positive active material layer and the positive electrode functional layer.

10. The rechargeable lithium battery of claim 1, wherein the first positive active material comprises one of $LiCoO_2$, $Li_bM^1_{1-y}1-z1M^2_y1M^3_z1O_2$ (0.9≤b≤1.8, 0≤y1≤1, 0≤z1≤, 0≤y1+z1≤1, and $M^1$, $M^2$, and $M^3$ are independently a metal of Ni, Co, Mn, Al, Sr, Mg, or La), and a combination thereof.

11. The rechargeable lithium battery of claim 1, wherein the second positive active material comprises $LiFePO_4$.

12. The rechargeable lithium battery of claim 1, wherein the flake-shaped polyethylene particles have an average particle size (D50) of about 1 μm to about 8 μm.

13. The rechargeable lithium battery of claim 1, wherein a ratio of the long axis length relative to the short axis length of the flake-shaped polyethylene particles is about 1 to about 5.

14. The rechargeable lithium battery of claim 1, wherein a thickness of the flake-shaped polyethylene particles is about 0.2 μm to about 4 μm.

15. The rechargeable lithium battery of claim 1, wherein the negative electrode functional layer further comprises inorganic particles and a binder.

16. The rechargeable lithium battery of claim 15, wherein a sum amount of the flake-shaped polyethylene particles and the inorganic particles over an amount of the binder ranges within a weight ratio of about 80:20 to about 99:1.

17. The rechargeable lithium battery of claim 15, wherein the flake-shaped polyethylene particles over the inorganic particles range within a weight ratio of about 95:5 to about 10:90.

18. The rechargeable lithium battery of claim 1, wherein the negative electrode functional layer has a thickness of 1 μm to about 10 μm.

19. A rechargeable lithium battery, comprising:
a negative electrode comprising:
a negative current collector;
a negative active material layer disposed on the negative current collector; and
a negative electrode functional layer disposed on the negative active material layer; and
a positive electrode comprising:
a positive current collector; and
a positive active material layer disposed on the positive current collector, wherein the negative electrode functional layer comprises:
flake-shaped polyethylene particles,
wherein the positive active material layer comprises:
a first positive active material comprising at least one of a composite oxide of a metal selected from cobalt, manganese, nickel, and a combination thereof and lithium;
a second positive active material including a compound represented by Chemical Formula 1,

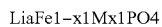
$$Li_aFe_{1-x1}M_{x1}PO_4 \quad \text{Chemical Formula 1}$$

wherein, in Chemical Formula 1, 0.90≤a≤1.8, 0≤x1≤0.7, and M is Mn, Co, Ni, or a combination thereof; and
carbon nanotubes, which have an average length of 30 μm to about 100 μm,
wherein the positive active material layer further comprises a positive electrode conductive material, and
wherein the positive electrode conductive material is included in an amount of about 0.1 wt % to about 0.6 wt % based on a total weight of the positive active material layer.

20. The rechargeable lithium battery of claim 19, wherein an aspect ratio of average length over average diameter of the carbon nanotubes is 1,000 to 5,400.

* * * * *